United States Patent [19]
Riner

[11] Patent Number: 5,109,971
[45] Date of Patent: May 5, 1992

[54] PALLET TRANSPORT DEVICE

[75] Inventor: Felix Riner, Frick, Switzerland

[73] Assignee: Gebruder Frech AG, Switzerland

[21] Appl. No.: 686,199

[22] Filed: Apr. 16, 1991

[30] Foreign Application Priority Data

Apr. 20, 1990 [CH] Switzerland ............... 01350/90

[51] Int. Cl.⁵ .............................................. B65G 13/00
[52] U.S. Cl. ............................ 193/35 A; 193/40; 198/633
[58] Field of Search ............. 193/35 A, 40, 32; 198/633; 244/118.1, 137.1

[56] References Cited

U.S. PATENT DOCUMENTS

| | | | |
|---|---|---|---|
| 3,881,585 | 5/1975 | Coleman et al. | 193/35 A |
| 3,891,073 | 6/1975 | Coleman et al. | 193/40 X |
| 4,182,440 | 1/1980 | Juergens | 193/35 A |
| 4,787,808 | 11/1988 | Shimoji et al. | 193/35 A X |

FOREIGN PATENT DOCUMENTS

| | | | |
|---|---|---|---|
| 0263784 | 9/1987 | European Pat. Off. | |
| 1953901 | 5/1971 | Fed. Rep. of Germany | 193/35 A |
| 2593476 | 7/1987 | France | 193/35 A |
| 0889569 | 12/1981 | U.S.S.R. | 193/35 A |
| 1470439 | 4/1977 | United Kingdom | 193/35 A |

Primary Examiner—Robert P. Olszewski
Assistant Examiner—James R. Bidwell
Attorney, Agent, or Firm—Speckman & Pauley

[57] ABSTRACT

A pallet transport device having a securing element positioned between two longitudinal rails in projections of a non-driven pallet transport device. A shaped body is seated on an axle. When docking with a driven pallet transport device, each projection is pushed into a docking receptacle so that a lower, shaped activation surface contacts and pushes the shaped body into a specified position. The shaped body thus pivots about an axis and the pallet can be displaced as desired. When the pallet transport device is undocked, the shaped body pivots upwards and the securing surface locks the pallet in a locking direction. Thus, the pallet transport device can be locked or unlocked without external help and has a high degree of operational dependability.

8 Claims, 2 Drawing Sheets

PALLET TRANSPORT DEVICE

BACKGROUND OF THE INVENTION

1. Field of the Invention

This invention relates to a non-driven pallet transport device for receiving pallets, which has projections that are correspondingly received in designed docking receptacles of a driven pallet transport device. The projections form extensions of roller conveyors on which the pallets are displaceable. The pallet transport device has at least one securing element including a shaped body which is pivotally seated around an axle extending in a displacement direction of the pallet. The pallet transport device has at least one three-dimensional activation surface and a securing surface extending vertically to the displacement direction.

2. Description of Prior Art

A conventional pallet transport device is taught by European Patent Reference EU-B-0263784. A securing element for fixing a pallet or a container, for use in aircraft, on a roller conveyor is described in this reference. Operation of the securing element is accomplished either with a hydraulic or pneumatic cylinder, actuable on both sides, or simply mechanically via rods or a pull rope with a lever.

Increasing attempts are now being made in airport applications to automate handling of the pallets. The pallets are moved out of the aircraft on a lifting platform, are lowered with the lifting platform and then are picked up by a mobile pallet transport device. The pallets are then transported to an empty, non-driven transport device or are transferred from the mobile pallet transport device to the non-driven pallet transport device. Many of these non-driven pallet transport devices contain relatively complicated mechanical systems for moving the pallets on the roller conveyor of the non-driven pallet transport device. Lately, use of such approach has diminished. Instead, the non-driven pallet transport devices have two projections forming extensions of the roller conveyor and are suitable for docking with the driven pallet transport devices. In this connection, the projections of the non-driven pallet transport devices extend into the docking receptacles of the driven pallet transport devices. By docking one of the two pallet transport devices with the other, it is possible to mechanically design the non-driven pallet transport devices to be relatively simple. However, the requirement for automatic locking of the pallets on the non-driven pallet transport devices opposes such design. Hydraulic operation of the pallet securing elements would require an appropriate hydraulic coupling with the mobile driven pallet transport device, while the purely mechanical solution using a lever opposes the desire for automation. In addition, a solution is relatively complicated in a mechanical sense. Finally, the known solution by use of a pallet securing element is nearly impossible to position at the desired place, namely in the area of the projections.

SUMMARY OF THE INVENTION

Accordingly, it is an object of this invention to provide a non-driven pallet transport device for transporting pallets wherein the non-driven pallet transport device has projections which are received within corresponding docking receptacles of a driven pallet transport device and the projections form extensions of roller conveyors on which the pallets are displaced. The pallet transport device has at least one securing element with a shaped body that is pivotally seated about an axle extending in a displacement direction of the pallet. The shaped body has at least one three-dimensional activation surface and a securing surface which extends in a vertical direction, with respect to the displacement direction of the pallet. A pallet securing element is automatically operated on the non-driven pallet transport device, during docking and undocking, with a driven pallet transport device. According to this invention, it is not necessary to provide corresponding drive mechanisms or mechanical activation elements.

Such object of this invention is achieved with a pallet transport device wherein the shaped body is positioned in an end section of at least one projection. The shaped body has a second activation surface which, in the undocked condition of the pallet transport device, extends below the roller conveyor in a support area of the projection. The first activation surface and the securing surface of the shaped body are maintained above the roller conveyor, which is pivoted into a movement area of the pallets by a spring force. Thus, the shaped body positioned in the end section of at least one projection has two activation surfaces, one of which extends above the roller conveyor and the other which extends below the roller conveyor. Accordingly, it can be pushed out of the area of the roller conveyor by a pallet rolling over it, after which it locks the pallet in the desired position by use of its securing surface. It can be pushed out of the roller conveyor by the docking pallet transport device. Accordingly, the roller conveyor is always fully available and the pallet is always displaceable whenever the driven and the non-driven pallet transport device are in the docking position with respect to each other.

In one preferred embodiment according to this invention, the shaped body is fixedly seated on a centered pivot axle. Thus, the shaped body of the pallet securing element always returns into the desired locking position through use of a tension spring which engages the shaped body outside of the pivot axle. Further preferred embodiments of this invention are discussed below.

A preferred embodiment of this invention is shown in the attached drawings and will be explained in the following description.

DESCRIPTION OF PREFERRED EMBODIMENTS

Non-driven pallet transport devices are often technically referred to as "dollies". They are basically non-driven carts having a chassis with a non-directional or rigid axle and a steering axle. The non-driven carts are directly or indirectly engaged with a hitch. A frame with a plurality of roller conveyors is rotatably seated on the chassis. For docking the non-driven pallet transport device with the driven pallet transport device, the frame with the roller conveyors is rotated 90°, so that the roller conveyors extend vertically, with respect to a longitudinal direction of the dolly. In this case, the projections extend beyond the front of the dolly.

Figure 1:
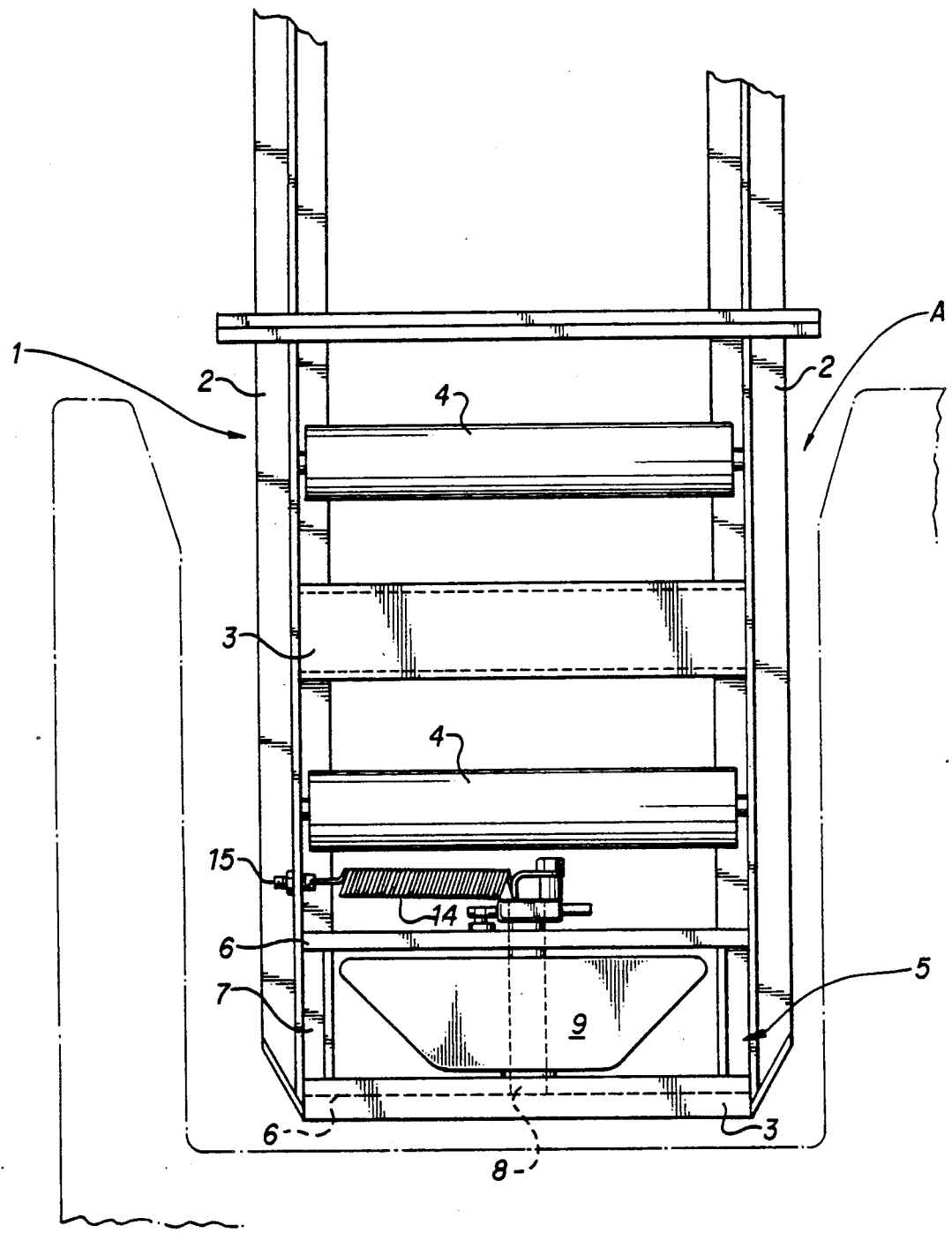
FIG. 1 is a partial top view of a non-driven pallet transport device according to one embodiment of this invention.

As shown in FIG. 1, each projection 1 has a frame construction with two longitudinal rails 2. The ends of the two longitudinal rails 2 on one side are screwed or secured to the frame of the entire roller assembly and the opposite ends are connected with each other by a cross rail 3. Rollers 4 are rotatably mounted between the two longitudinal rails 2 of a projection. According to one preferred embodiment of this invention, the pallet securing element 5 is positioned between the front roller 4 and the cross rail 3, at the front end. It has a frame constructed of two longitudinal struts 6 extending crosswise with respect to the longitudinal rails 2 of the projection 1, between the longitudinal rails 2 and two connecting struts 7. The center of the two longitudinal struts 6 is penetrated by an axle 8, on which a shaped body 9 is fixedly seated.

Figure 2:
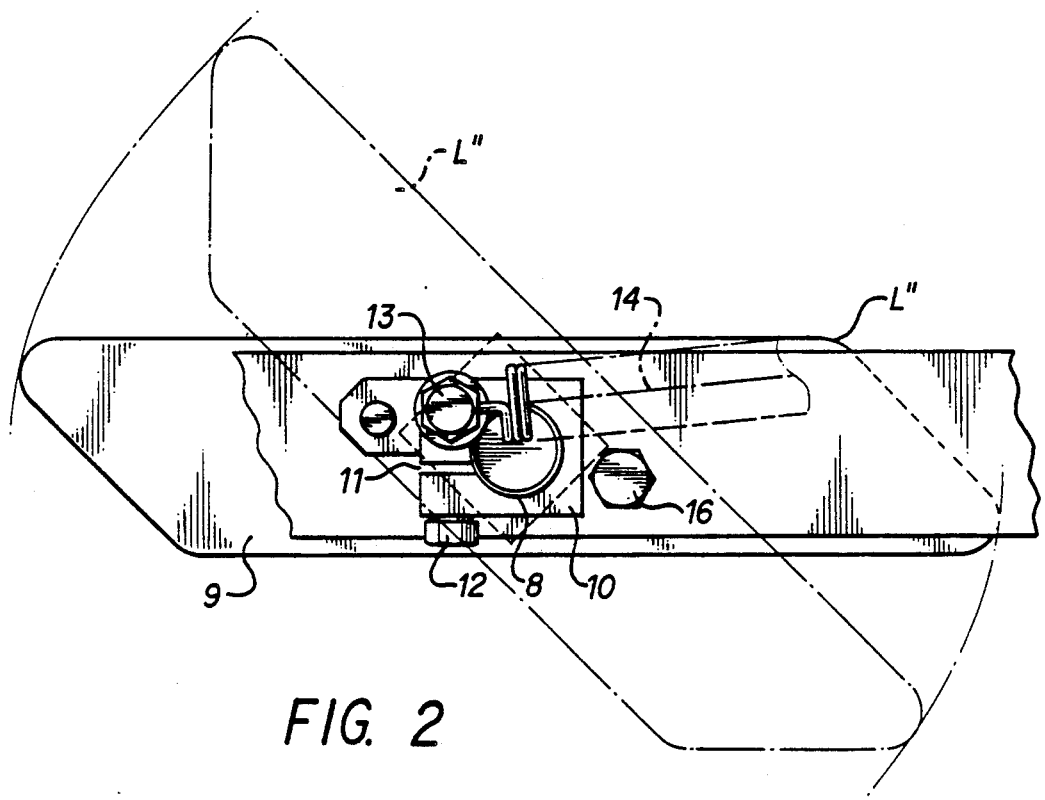
FIG. 2 is a detailed side view of the pallet securing element in a non-locking position.

As shown in FIG. 2, a clamping plate 10 is seated on the axle 8 which is preferably constructed of a piece of pipe. The clamping plate 10 has a bore corresponding to the diameter of the axle 8 and has an approximately radially positioned slit 11. A bore extending over the slit 11 and having a threaded portion on one side is used to receive the clamping screw 12. A bolt 13, on which a tension spring 14 acts, is fixed outside of the axle 8. The other end of the tension spring 14 is fixed on one of the two longitudinal rails 2. This is accomplished with a threaded bolt 15, as shown in FIG. 1, which permits longitudinal adjustment for setting the pre-tension of the spring 14, so that the shaped body 9 is pulled into the locked position with the desired force. In this case, the rectangular clamping plate 10 rests against a stop 16.

Figure 3:
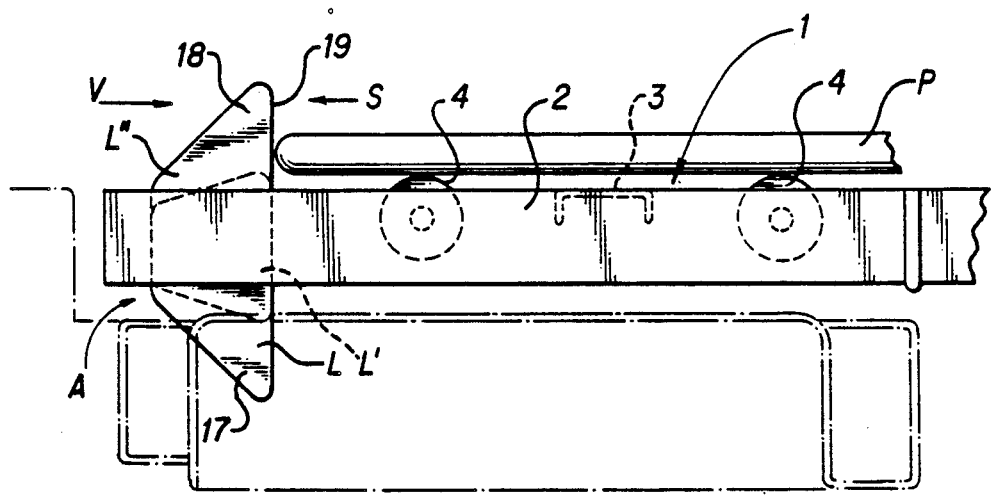
FIG. 3 is a side view of a projection of a non-driven pallet transport device with the pallet securing element in a locking position.

Referring to FIG. 3, a docking receptacle A of the self-propelled pallet transport device, technically referred to as "trailer", is shown by dashed lines.

As previously described, the roller assembly with the projections 1 is rotated 90° prior to docking. The self-propelled pallet transporter with the docking receptacles A moves in and thus pushes against the lower activating surface 17 of the shaped body 9. Accordingly, the shaped body 9 is pivoted into the unlocking position L. In this position it is possible to push a pallet P on the dolly in a displacement direction V. If the upper activation surface 18 extends too far into the plane of the roller conveyor formed by the rollers 4, it does not cause an obstruction since, while rolling over the shaped body 9, the pallet P can further push down the activation surface 18, which is also of three-dimensional shape. During normal operation, however, the trailer would be slightly raised, so that the longitudinal rails 2 of the projections 1 directly rest in the docking receptacles A and push the shaped body 9 into the position L', indicated by broken lines in FIG. 2.

As soon as the self-propelled pallet transport device moves away, the shaped body 9 moves into the locking position L", as shown in FIG. 2. The tension spring 14 assures this action by pulling the shaped body 9 into its end position against the stop 16. In the locking position L", the securing surface 19 is activated and assures that the pallet P can no longer roll off the dolly in a locking direction S.

It is assured in this way that the pallet securing element 5 is always pivoted out of the roller conveyor when pallets must be displaced, for example in the docked position. On the other hand, during undocking it is also assured that the pallet securing element 5 automatically assumes the locking position L".

A high degree of operational dependability is assured according to this invention, without the corresponding provision of a hydraulic or pneumatic activation device and without the necessity of an operator manipulating an appropriate lever, the operation of which might be forgotten.

The shaped body 9 is preferably constructed of a highly abrasion-resistant plastic material. In contrast to a metal piece, this better protects the pallet and reduces noise. Additionally, such a shaped piece 9 can be specially colored. This increases the attention of the operator and makes visual checking easier.

I claim:

1. In a non-driven pallet transport device for receiving pallets, the device including a plurality of projections (1) which are received in a plurality of correspondingly designed docking receptacles of a driven pallet transport device, the projections (1) forming extensions of a plurality of roller conveyors on which the pallets are displaceable, the improvement comprising: the pallet transport device having at least one securing element (5) positioned at a front end of each projection (1), each said securing element (5) comprising a shaped body (9) pivotally seated about a pivot axle (8) extending in a displacement direction of each pallet and having at least one first activation surface (18) and a securing surface (19) extending vertically to the displacement direction, the shaped body (9) positioned in a section of the front end of at least one of the projections (1) and the shaped body (9) having a second activation surface (17) which in an undocked condition of the pallet transport device extends below the roller conveyor in a support area of each said projection (1), while the first activation surface (18) and the securing surface (19) of the shaped body (9) are maintained above the roller conveyor and are pivoted into a movement area of the pallets by a spring force.

2. A pallet transport device according to claim 1, wherein the shaped body (9) is fixedly seated on the centered pivot axle (8).

3. A pallet transport device according to claim 1, wherein a tension spring (14) engaging the shaped body (9) outside of the pivot axle (8) provides the required spring force.

4. A pallet transport device according to claim 2, further comprising a clamping plate (10), on which a tension spring (14) acts to provide the spring force, is positioned on the pivot axle (8).

5. A pallet transport device according to claim 4, wherein the clamping plate (10) has a stop face which cooperates with a stop (16) that is secured to a longitudinal rail (2) of the roller conveyor.

6. A pallet transport device according to claim 1, wherein the shaped body (9) is constructed of an abrasion-resistant plastic material.

7. A pallet transport device according to claim 1, wherein each roller conveyor comprises two longitudinal rails (2) extending below a lowest point of a plurality of rollers of the roller conveyors and the longitudinal rails (2) are used as support surfaces of the projections (1) in a docked condition of the pallet transport device.

8. A pallet transport device according to claim 3, wherein the tension spring (14) is adjustably fixed with a screw bolt (15) on one of the longitudinal rails (2) of the roller conveyor.

* * * * *